US006935994B2

(12) United States Patent
Nakano

(10) Patent No.: US 6,935,994 B2
(45) Date of Patent: Aug. 30, 2005

(54) FIXING ROLLER

(75) Inventor: Hiroyuki Nakano, Tokyo (JP)

(73) Assignee: Nitto Kogyo Co., Ltd., Tokyo (JP)

( * ) Notice: Subject to any disclaimer, the term of this patent is extended or adjusted under 35 U.S.C. 154(b) by 0 days.

(21) Appl. No.: 09/748,012

(22) Filed: Dec. 27, 2000

(65) Prior Publication Data

US 2002/0012550 A1 Jan. 31, 2002

(51) Int. Cl.[7] ...... F16C 13/00
(52) U.S. Cl. ...... 492/56; 492/50
(58) Field of Search ...... 492/53, 50, 56

(56) References Cited

U.S. PATENT DOCUMENTS

| | | | | |
|---|---|---|---|---|
| 4,550,243 A | * 10/1985 | Inagaki | 219/216 |
| 4,844,953 A | * 7/1989 | Kato et al. | 427/387 |
| 4,950,538 A | * 8/1990 | Honda et al. | 428/35.7 |
| 5,045,891 A | * 9/1991 | Senba et al. | 399/331 |
| 5,106,682 A | * 4/1992 | Matsushita et al. | 428/324 |
| 5,123,151 A | * 6/1992 | Uehara et al. | 492/56 |
| 5,324,885 A | * 6/1994 | Koga et al. | 492/56 |
| 5,334,124 A | * 8/1994 | Ohno | 492/53 |
| 5,450,181 A | * 9/1995 | Tsukida et al. | 492/46 |
| 5,520,600 A | * 5/1996 | Fukumoto | 492/56 |
| 5,547,742 A | * 8/1996 | Satoh et al. | 492/56 |
| 5,564,196 A | * 10/1996 | Nomura et al. | 492/54 |
| 5,572,275 A | * 11/1996 | Jinzai | 492/53 |
| 5,698,320 A | * 12/1997 | Ebisu et al. | 428/373 |
| 5,709,949 A | * 1/1998 | Chen et al. | 492/53 |
| 5,717,988 A | * 2/1998 | Jinzai et al. | 492/56 |
| 5,725,209 A | * 3/1998 | Takahashi et al. | 271/122 |
| 5,900,295 A | * 5/1999 | Kawada | 492/56 |
| 6,061,545 A | * 5/2000 | Cerrah | 399/330 |
| 6,063,463 A | * 5/2000 | Schlueter et al. | 428/36.91 |
| 6,085,058 A | * 7/2000 | Goto et al. | 399/313 |
| 6,092,032 A | * 7/2000 | Hirayama | 492/9 |
| 6,132,815 A | * 10/2000 | Takahashi et al. | 427/553 |
| 6,284,373 B1 | * 9/2001 | Ream et al. | 492/48 |
| 6,333,070 B1 | * 12/2001 | Ferro | 427/148 |

FOREIGN PATENT DOCUMENTS

| | | |
|---|---|---|
| JP | 57172374 A | * 10/1982 |
| JP | 4298778 A | * 10/1992 |
| JP | 410252742 A | * 9/1998 |

* cited by examiner

*Primary Examiner*—Marc Jimenez
(74) *Attorney, Agent, or Firm*—Westerman, Hattori, Daniels & Adrian, LLP

(57) ABSTRACT

The present invention provides a fixing roller capable of satisfying releasing ability and scratch resistance all together. The fixing roller comprises a core 16, a primer layer 18 applied on the periphery of the core 18, and a fluororesin top layer 20 applied on the periphery of the primer layer 18, wherein glass particles 24 are mixed into at least one of the primer layer 18 and the top layer 20.

13 Claims, 7 Drawing Sheets

FIXING ROLLER

FIELD OF THE INVENTION

The present invention relates to a fixing roller for use in a fixing apparatus which is applied for fusing and pressing unfixed toner on a sheet so as to fix the toner onto the sheet in copier, printer, facsimile, and the like.

BACKGROUND OF THE INVENTION

Heretofore, in a fixing apparatus of electrophotographic equipment, a so-called two-roller arrangement has been employed, which essentially includes two rollers, a heating roller having a heat source built-in and a pressing roller pressed to the heating roller with a predetermined pressure. In parallel with various related patent applications, this arrangement has been widely used.

As a conventional structure of a heating roller used in the above fixing apparatus, there is generally known a so-called two-layer structure having a core, a primer layer applied on the peripheral surface of the core, and a resin layer bonded to the core through the primer layer. As a material of the resin layer, PTFE (polytetrafluoroethylene) has heretofore been applied. This PTFE resin layer is desirable in view of long life or durability because it has a sufficient hardness and an excellent scratch resistance standing for a level of wear of the layer caused by a contacting object, such as sheets and separating claws, during passing sheets therethrough.

However, the PTFE resin layer is inferior in releasing ability. Specifically, a drawback is pointed out that an unfixed toner tends to be attached onto the peripheral surface of the roller and is thus attached again onto the surface of a succeeding sheet, resulting in a problem of image. Thus, PFA (perfluoroalkoxy resin) has heretofore been developed and come into practice use as the resin layer. A heating roller having the PFA resin layer can assure to improve the releasing ability and solve the problem of image, but causes an adverse problem of an inferior scratch resistance (i.e. inferior durability).

As described above, the conventional fixing rollers, such as heating rollers, are in the situation that giving weight to releasing ability causes a deteriorated scratch resistance, while giving weight to scratch resistance causes a deteriorated releasing ability. A material capable of solving both problems all at once has not been found out.

It can be assumed to combine PFA resin with PTFE resin. However, it is difficult to arrange an adequate condition to fully bring out advantages of both resins due to different melting points between both resins. As a result, while such a material is come into practice use, it still involves some problems to be solved.

SUMMARY OF THE INVENTION

The present invention is developed to solve the problems described above.

It is a primary object of the present invention to provide a fixing roller capable of satisfying releasing ability and scratch resistance all together.

In order to settle the problems and to achieve the objects described above, according to an aspect of the present invention, a fixing roller comprises a core, a primer layer applied on the periphery of the core, and a fluororesin top layer applied on the periphery of the primer layer, wherein glass particles are mixed into at least one of the primer layer and top layer.

In a first embodiment of the present invention, the glass particles may be mixed into only the primer layer.

In a second embodiment of the present invention, the glass particles may be mixed into only the top layer.

In a third embodiment of the present invention, the glass particles may be mixed into both the primer layer and top layer.

In the second and third embodiments of the present invention, a mixing ratio of the glass particles in the top layer may be arranged in a weight ratio of 1% or more.

In a fourth embodiment of the present invention, the top layer may include PFA (perfluoroalkoxy resin).

In a fifth embodiment of the present invention, the total thickness of the primer layer and top layer may be arranged in up to 30 $\mu$m.

In the third embodiment of the present invention, the fixing roller may further include a fluororesin overtop layer applied on the peripheral surface of the top layer. The overtop layer may be devoid of the glass particles. Further, the overtop layer may include PFA (perfluoroalkoxy resin). In these embodiments, the total thickness of the primer, top, and overtop layers may be arranged in up to 30 $\mu$m.

These and other aspect of the present invention are apparent in the following detailed description and claims, particularly when considered in conjunction with the accompanying drawings.

DETAILED DESCRIPTION OF THE PREFERRED EMBODIMENTS

Figure 1:
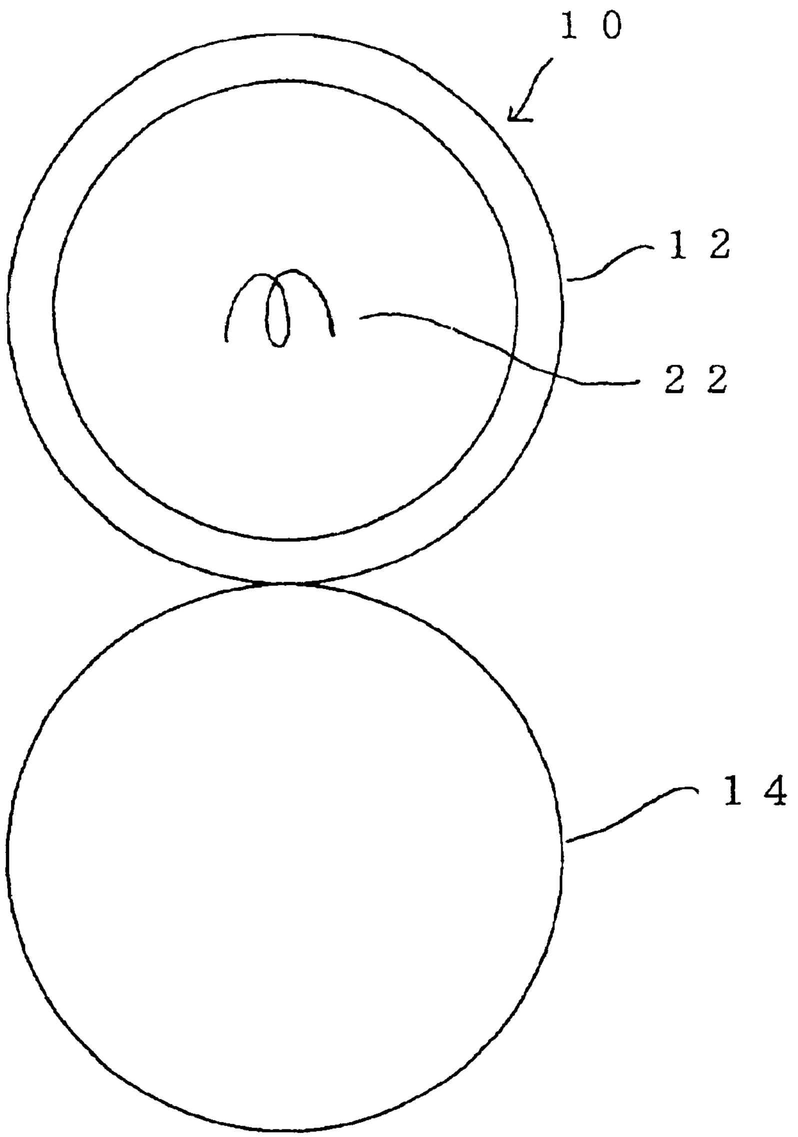
FIG. 1 is a schematic front view showing a fixing apparatus using a fixing roller according to the present invention.
Figure 2:
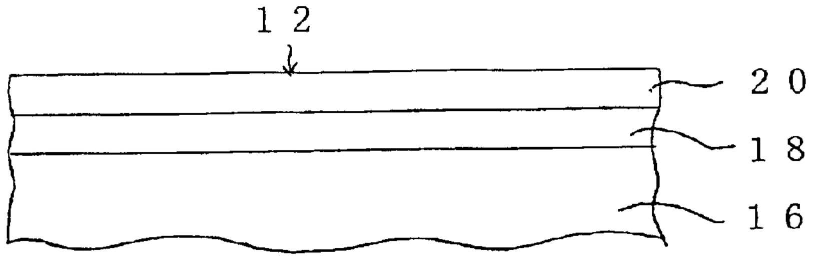
FIG. 2 is a partial front view showing a heating roller as a fixing roller used in the fixing apparatus shown in FIG. 1.

Referring to FIGS. 1 and 2 in the accompanying drawings, a structure and manufacturing method of one embodiment of a fixing roller according to the present invention will now be described in detail.

Outline of A Fixing Apparatus 10

With reference to FIG. 1, a fixing apparatus 10 having a fixing roller as this one embodiment will first be described. The fixing apparatus 10 includes a fixing housing (not shown) secured to a frame of an electronic image forming equipment (not shown), e.g. an electronic printer. In this fixing housing, the fixing apparatus 10 also includes a heating roller 12 as the fixing roller of this embodiment, and a pressing roller 14 pressed to the heating roller 12 with a predetermined pressure.

As shown in FIG. 2, the heating roller 12 includes an aluminum core 16, a primer layer 18 applied on the periphery of the core 16, and a fluororesin top layer 20 (surface layer) applied on the primer layer 18 so as to bonded on the periphery of the core 16 through the primer layer 18. The heating roller 12 is rotatably driven at a predetermined rotational speed by driving means (not shown) and has a halogen lamp 22 as a heat source built-in. In this embodiment, the heating roller 12 is arranged in 30 mm of outside diameter.

The top layer is comprised of perfluoroalkoxy resin (tetrafluoroethylene -perfluoroalkylvinylether copolymer resin: hereinafter referred to as PFA) as fluororesin material.

On the other hand, while the pressing roller 14 is not shown in detail, it includes an iron core having a nickel-plated surface, a cylindrical elastic layer bonded on the periphery of the core through a primer, and a releasing layer having a predetermined thickness and formed of a fluororesin layer covering the peripheral surface of the elastic layer. In this embodiment, the pressing roller 14 is arranged in 30 mm of outside diameter.

In the aforementioned coating film on the periphery of the core 16 of the heating roller 12, as a feature of the present invention, a structure having the top layer 20 bonded on the peripheral surface of the core 16 through the primer layer 18, or a two-layer structure composed of the primer layer 18 and top layer 20, is employed, and glass particles 24 are mixed into at least one of the primer layer 18 and top layer 20.

A first embodiment in which the glass particles 24 are mixed into only top layer 20, a second embodiment in which the glass particles 24 are mixed into only primer layer 18, and a third embodiment in which the glass particles 24 are mixed into both the primer layer 18 and top layer 20 will be described in turn. Before starting these descriptions, a common manufacturing method of the heating roller 12 in the first to third embodiments will now be described.

In the manufacturing method of the heating roller 12, the peripheral surface of the core 16 is subjected to a surface treatment including cleaning, and then applied with a primer. For the second and third embodiments, the glass particles 24 are mixed with a primer solution of raw material at a predetermined weight ratio, and uniformly dispersed over the primer solution. Then, the applied primer is subjected to a forced drying at 80 to 100° C. for about 20 to 30 minutes. Resultingly, the primer layer 18 is formed on the peripheral surface of the core 16.

Then, a PFA resin is applied on the periphery of the primer layer 18. For the first and third embodiments, the glass particles 24 are mixed with a PFA resin solution of raw material at a predetermined weight ratio, and uniformly dispersed over the resin solution. Then, the applied PFA is subjected to a forced drying at 80 to 100° C. for about 20 to 30 minutes. Resultingly, the top layer 20 is formed on the peripheral surface of the primer layer 18.

Lastly, the entire heating roller 12 is subjected to a firing at 360 to 400° C. for about 30 to 40 minutes. Through this firing process, the heating roller 12 is eventually completed.

On the other hand, the method for forming the PFA top layer 20 is not limited to the application as describe above, and may include a method based on covering with a heat contraction tube made of PFA.

Now, the first and third embodiments will be described in turn.

(First Embodiment)

Figure 3:
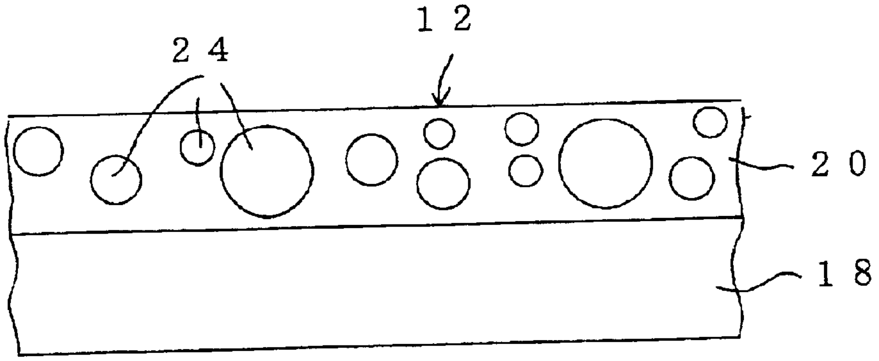
FIG. 3 is a longitudinal sectional view of a first embodiment of the heating roller shown in FIG. 2.

In the first embodiment, the glass particles 24 are mixed into, only the top layer 20, but not mixed into the primer layer 18, as shown in FIG. 3. In the first embodiment, the Model No. MP-910BK Primer made by DU PONT-MITSUI FLUOROCHEMICALS Co., Ltd. was used as a material of the primer layer 18, and applied to form a layer of 10±5 μm thickness. The Model No. 510CL PFA Enamel made by DU PONT-MITSUI FLUOROCHEMICALS Co., Ltd. was used as a material of the top layer 20, and applied to form a layer of 10±5 μm thickness. Thus, in the first embodiment, a total thickness of the entire coating film combined the primer layer 18 and top layer 20 is up to 30 μm.

Figure 6:
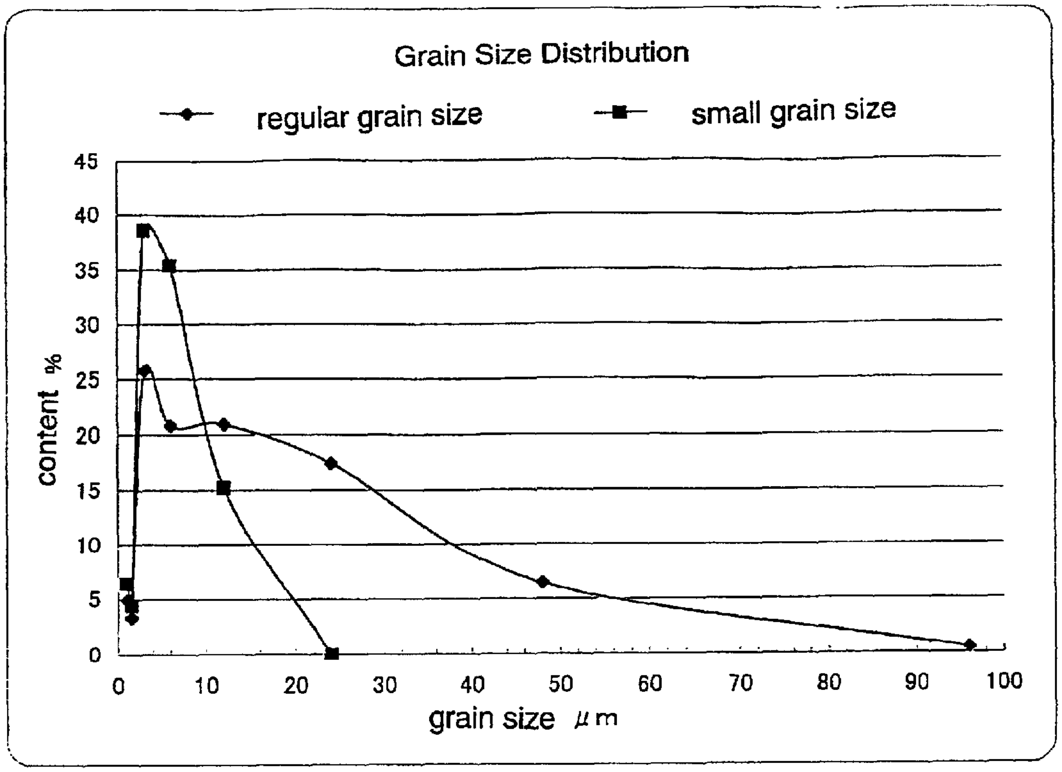
FIG. 6 is a diagram showing a grain size distribution of glass particles having regular grain size and small grain size.

Small grain size of glass particles were used as the glass particles 24 mixed into the top layer 20, and mixed in a weight ratio of 3%. The small grain size of glass particles 24 are glass particles having a grain size distribution as shown by a quadrangular black dot (■) in FIG. 6 and characteristics shown in the following Table 1.

TABLE 1

| small grain size | | | | | |
|---|---|---|---|---|---|
| total moisture (%) | electric conductivity (μS/cm) | electric conductivity blank value (μS/cm) | pH | pH blank value | average grain size (μm) |
| 0.14 | 2.0 | 1.0 | 5.6 | 5.8 | 3.0 |

(Second Embodiment)

Figure 4:
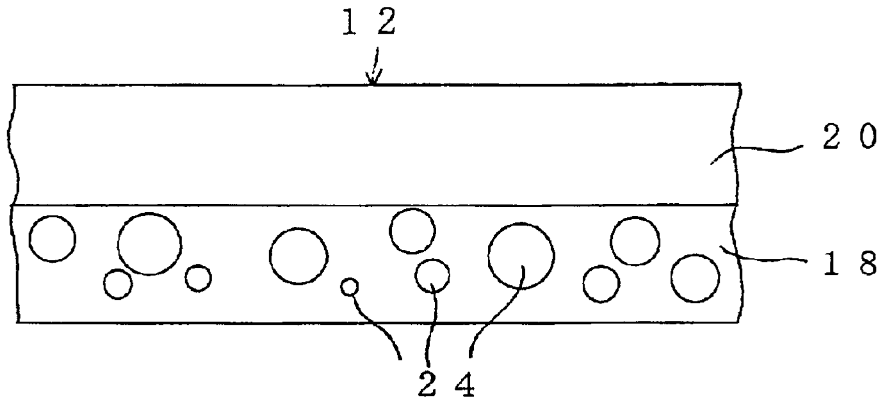
FIG. 4 is a longitudinal sectional view of a second embodiment of the heating roller shown in FIG. 2.

In the second embodiment, the glass particles 24 are mixed into only the primer layer 18, but not mixed into the top layer 20, as shown in FIG. 4. In the second embodiment, the same material as the above first embodiment was used as a material of the primer layer 18, and applied to form a layer of 10±5 μm thickness. The same material as the above first embodiment was used as a material of the top layer 20, and applied to form a layer of 10±5 μm thickness. Thus, in the second embodiment, a total thickness of the entire coating film combined the primer layer 18 and top layer 20 is up to 30 μm.

Regular grain size of glass particles were used as the glass particles 24 mixed into the primer layer 18, and mixed in a weight ratio of 30%. The regular grain size of glass particles 24 are glass particles having a grain size distribution as shown by a diamond-shaped black dot (♦) in FIG. 6 and characteristics shown in the following Table 2.

TABLE 2

| regular grain size | | | | | |
|---|---|---|---|---|---|
| total moisture (%) | electric conductivity (μS/cm) | electric conductivity blank value (μS/cm) | pH | pH blank value | average grain size (μm) |
| 0.07 | 3.4 | 1.0 | 5.1 | 5.8 | 5.1 |

(Third Embodiment)

Figure 5:
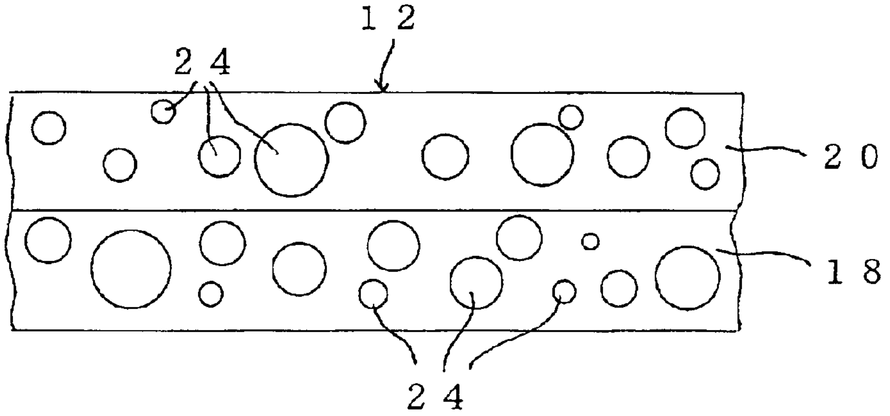
FIG. 5 a longitudinal sectional view of a third embodiment of the heating roller shown in FIG. 2.

In the third embodiment, the glass particles 24 are mixed into the primer layer 18 and top layer 20 respectively, as shown in FIG. 5. In the third embodiment, the same material as the above first and second embodiments was used as a material of the primer layer 18, and applied to form a layer of 10±5 μthickness. The same material as the above first and second embodiments was used as a material of the top layer 20, and applied to form a layer of 10±5 μm thickness. Thus, in the third embodiment, a total thickness of the entire coating film combined the primer layer 18 and top layer 20 is up to 30 μm.

Regular grain size of glass particles equal to the second embodiment were used as the glass particles 24 mixed into the primer layer 18, and mixed in a weight ratio of 30%. Small grain size of glass particles equal to the first embodiment were used as the glass particles 24 mixed into the top layer 20, and mixed in a weight ratio of 3%.

Then, in parallel with fabricating heating rollers of the first to third embodiments, heating rollers of the conventional structure described in the section of Background of the Invention was fabricated, and these were provides as a first to third conventional examples. The heating rollers of the first to third conventional examples were fabricated to have the same structure identical to the above first to third embodiments except each material of the primer layer and top layer.

(First Conventional Example)

In the heating roller of the first conventional example, the Model No. MP-902BN Primer made by DU PONT-MITSUI FLUOROCHEMICALS Co., Ltd. was used as a material of the primer layer, and applied to form a layer of 10±5 μm thickness. The heat contraction PFA tube (Model No: SMT) made by Gunze Ltd. was used as a material of the top layer. The glass particles were mixed into neither the primer layer nor the top layer.

(Second Conventional Example)

In the heating roller of the second conventional example, the Model No. EK-1908GY Primer made by Daikin Industries, Ltd. was used as a material of the primer layer, and applied to form a layer of 10±5 μm thickness. The Model No. EK-4800CR PTFE Resin made by Daikin Industries, Ltd. was used as a material of the top layer, and applied to form a layer of 10±5 μm thickness. The glass particles were mixed into neither the primer layer nor the top layer.

(Third Conventional Example)

In the heating roller of the third conventional example, the Model No. 855-300 Primer made by Du Pont de Nemours & Co. was used as a material of the primer layer, and applied to form a layer of 10±5 μm thickness. The Model No. 855-403 PTFE Resin/PFA mixture made by Du Pont de Nemours & Co. was used as a material of the top layer, and applied to form a layer of 10±5 μm thickness. The glass particles were mixed into neither the primer layer nor the top layer.

The first to third embodiments and the first to third conventional examples constructed as describe above were verified in their durability. The verification test for durability will now be described. This durability means both releasing ability and scratch resistance. When both the releasing ability and the scratch resistance were evaluated as more than "Good", the durability was judged as "Good". When either one of or neither of the releasing ability and the scratch resistance was evaluated as "Good", the durability was judged as "Bad".

While the releasing ability will be described later in detail, the deterioration of the releasing ability involved in the operation of passing sheets was judged from an offset phenomenon and a contaminated condition on the coating film surface herein. In the evaluation of the releasing ability described below, the mark "○" indicates "Good" condition, the mark "X" indicating "Bad" condition, and the mark "Δ" indicating better than "X", but "relatively Bad" condition.

While the scratch resistance will also be described later in detail, it was judged from a wear level of the coating film caused by contacting object, such as separating claws, involved in the operation of passing sheets. In the evaluation of the scratch resistance described below, the mark "○" indicates "Good" condition, the mark "X" indicating "Bad" condition, and the mark "Δ" indicating that it was judged as the "Bad" condition after the number of passed sheets exceeded 100 k.

(Verification Test of Releasing Ability)

In the verification test of the releasing ability, the DiALTA D350 (made by Minolta Co., Ltd., throughput capacity: 36 sheets/minute) was used as a tester.

A method for performing the verification test includes the following steps.

Using this tester, (1) First, with passing an A4 size Komine sheet in its lateral position and manually setting in the midpoint of the density control unit, a start sampling is performed to sample each one of black and white solid sheets.

(2) With using a first chart and setting in the auto-control of the density control unit, a first continuous passing of sheets is performed to continuously duplex for 2000 sheets (2 k sheets).

(3) With using a second chart and setting in the auto-control of the density control unit, a second continuous passing of sheets is performed to continuously duplex for 500 sheets (0.5 k sheets).

(4) After performing the printing operation of the passing of total 2500 sheets, with passing an A4 size Komine sheet in its lateral position and manually setting in the midpoint of the density control unit, each one of black and white solid sheets is sampled, and an accumulated page number and a passing direction of the sheet are written in each backside of these sampled Komine sheets.

(5) With new passing sheet, the above steps (2) to (4) are repeated.

In the verification test performed as described above, when an irregularity in gloss, an image defect from dents caused by separating claws, or a sneaking through phenomenon of toner contacting to separating claws or thermistors was induced in the black solid image obtained at the step (4), it was judged that a defect of black solid image was induced. When an offset phenomenon was induced in the white solid image obtained at the step (4), it was also judged that a defect of white solid image was induced. In the sampling performed for each 5000 sheets (i.e. 2500 sheet of duplex prints=5 k) at the step (4), when it was founded that a defect was induced either in the black solid image or in the white solid image, it was judged that the releasing ability was "Bad" in a check for each 5 k.

When the defect continuously occurred twice in the check for each 5 k, the releasing ability as the durability was conclusively judged as "Bad". Thus, at this point, the verification test was discontinued and the number of passed sheets at this finish point was recorded.

When no defect occurred or the defect did not occur continuously in the check for each 5 k, the sheet was passed through up to 300 k.

(Verification Test of Scratch Resistance)

At the time when the verification test of the releasing ability was completed or the verification test was discontinued due to occurrence of the defect, the verification test of the scratch resistance was carried out. In the verification test of the scratch resistance, the dent amount at the region of the coating film contacted with separating claws was measured. When the dent amount was 7 μm or less, it was judged as "Good ○". When the dent amount was deeper than 7 μm, it was judged as "Bad X".

This dent-amount measuring test was performed using the SURFCOM 575A (a surface geometry measuring device made by TOKYO SEIMITU Co., Ltd.) with 5.0 mm of measuring distance, 0.8 mm of cut off, 0.3 mm/sec of measuring speed, 2000 times of vertical magnification, and 20 times of horizontal magnification.

(Evaluation of Durability)

The evaluation result based on the above measurement result of the releasing ability in conjunction with the evaluation result based on the measurement result of the dent amount is shown in the following Table 3.

TABLE 3

| | | 1st conventional example | 2nd conventional example | 3rd conventional example | 1st embodiment | 2ndt embodiment | 3rd embodiment |
|---|---|---|---|---|---|---|---|
| coating layer construction | material of top layer | PFA | PTFE | PFE/PTFE | PFA | PFA | PFA |
| | with or w/o of glass in top layer | W/O | W/O | W/O | mixed | W/O | mixed |
| | with or w/o of glass in primer layer | W/O | W/O | W/O | W/O | mixed | mixed |
| durability | releasing ability | ○ 100k/OK | X 20k/NG | Δ 20k/NG | ○ 300k/OK | ○ 150k/OK | ○ 300k/OK |
| | scratch resistance | X 100k/NG | ○ 20k/OK | ○ 20k/OK | ○ 300k/OK | Δ 150K/NG | ○ 300k/OK |

As is apparent from the Table 3, the first conventional example has a good releasing ability due to the PFA top layer but a bad scratch resistance. The second conventional example has a good scratch resistance due to the PTFE top layer but a bad releasing ability. Since the third conventional example has a top layer made of the mixture of PFA and PTFE, it has a good scratch resistance but a relatively bad releasing ability. Overall, its durability could not be judged as “Good”.

On the other hand, in the embodiments described above, the glass particles 24 are mixed into either one of the primer layer 18 and top layer 20 so that both the releasing ability and scratch resistance are good. As a result, its durability could be judged as “Good”. Specifically, it has been proved that the releasing ability and scratch resistance could be satisfied all together by mixing the glass particles 24 into either one of the primer layer 18 and top layer 20.

(Verification of Suitable Range of Mixing Ratio of Glass Particles)

As described above, the releasing ability is improved by applying PFA as the material of the top layer 20, but the PFA as-is cannot guarantee a sufficient scratch resistance. Thus, by mixing the glass particles 24 into either one of the primer layer 18 and top layer 20, the scratch resistance which is not guaranteed by the PFA as-is can be maintained in good or excellent condition. From this point of view, a suitable range of the mixing ratio of the glass particles will be verified in connection with the scratch resistance.

First, in the same coating film structure as the first embodiment described above, the mixing ratios of the glass particles 24 to be mixed into the top layer 20 was prepared by four kinds of 0.5%, 1.0%, 2.0%, and 3.0% in weight %, and these embodiments were referred as to first embodiments 1̂, 2̂, 3̂, and 4̂ respectively.

In the same coating film structure as the second embodiment described above, the mixing ratios of the glass particles 24 to be mixed into the primer layer 18 was prepared by 30% in weight %, and this was referred as to second embodiment.

Further, in the same coating film structure as the third embodiment described above, the mixing ratios of the glass particles 24 to be mixed into the primer layer 18 was prepared by 30% in weight %, and the mixing ratios of the glass particles 24 to be mixed into the top layer 20 was prepared by six kinds of 0.5%, 1.0%, 2.0%, 3.0%, 5.0%, and 7.0% in weight %. Then, these embodiments were referred as to third embodiments 1̂, 2̂, 3̂, 4̂, 5̂, and 6̂ respectively.

In addition, for a comparative example, a heating roller to which the glass particles was mixed into neither the primer layer nor the top layer was fabricated. In this comparative example, the Model No. MP-910 BK Primer made by DU PONT-MITSUI FLUOROCHEMICALS Co., Ltd. was used as a material of the primer layer, and applied to form a layer of 10±5 μm thickness. The Model No. 510CL PFA Enamel made by DU PONT-MITSUI FLUOROCHEMICALS Co., Ltd. was used as a material of the top layer, and applied to form a layer of 10±5 μm thickness. The manufacturing method of this comparative example is the same as that described above and its description will thus be omitted herein.

Whereas the above verification test of the durability was performed in an actual apparatus, this verification test was performed by simulator test with a simulator tester. Specifically, the fixing components of the DiALTA D350 used for the verification test of the releasing ability was taken out, and the dent amount at the region of the top layer 20 contacted with separating claws was measured under an idling test.

Figure 7:
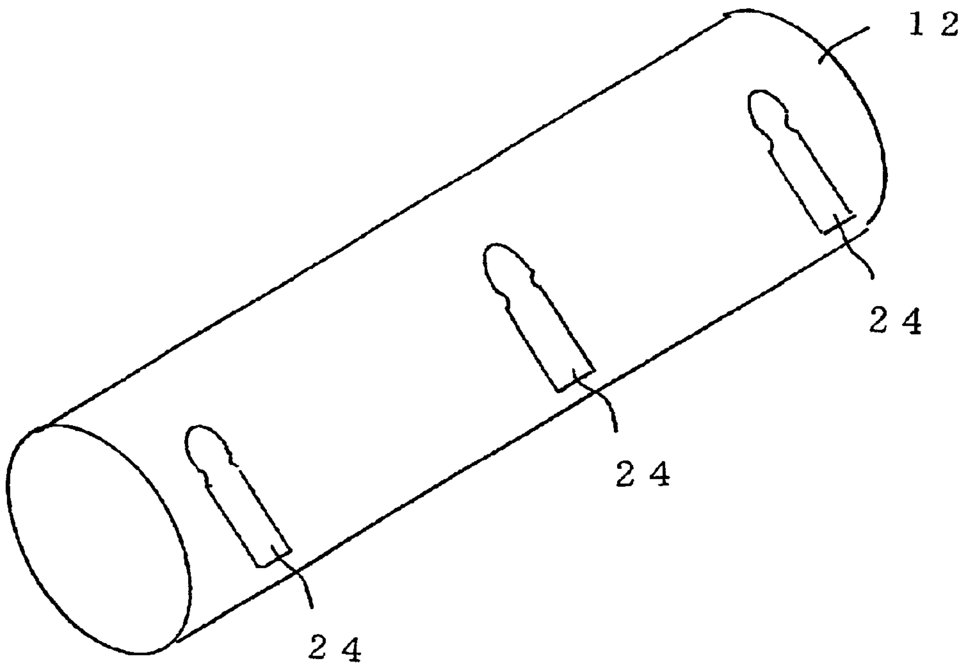
FIG. 7 is a front view showing an arrangement of separating claws.

As shown in FIG. 7, three separating claws were prepared, and positioned at left edge, center, and right edge portions along the axial direction of the heating roller 12, respectively. These three separating claws 26 were contacted to the top layer 20 of the heating layer 12 with loading a spring pressure (not shown) to the separating claws as in actual apparatuses. Each separating claw was changed to a new one for each test of respective heating rollers. The temperature of the heating roller was set at 200±5° C., the speed of passing sheets being set at 180 mm/sec, and the test time being set at successive 20 hours.

The verification test was carried out to each roller under the condition described above, and the dent amount was measured at the portion contacted with each separating claw, at the time when the test was completed. This measurement of the dent amount was performed by the same measuring device and under the same measuring condition as that used in the verification test of scratch resistance.

This measurement result is shown in the following Table 4. The measured dent amount is shown as a histogram in FIG. 8 based on the Table 4.

TABLE 4

| | claw ① | claw ② | claw ③ |
|---|---|---|---|
| 1st embodiment ① | 2.5 | 2.0 | 2.0 |
| 1st embodiment ② | 1.5 | 1.5 | 2.0 |
| 1st embodiment ③ | 1.0 | 1.5 | 1.0 |
| 1st embodiment ④ | 1.0 | 0.5 | 1.5 |
| 2nd embodiment | 8.0 | 9.0 | 9.0 |
| 3rd embodiment ① | 2.5 | 2.0 | 3.0 |
| 3rd embodiment ② | 1.5 | 1.5 | 1.5 |
| 3rd embodiment ③ | 0.5 | 0.5 | 1.0 |
| 3rd embodiment ④ | 1.5 | 1.0 | 1.0 |
| 3rd embodiment ⑤ | 0.5 | 1.0 | 0.5 |

TABLE 4-continued

| | claw ① | claw ② | claw ③ |
|---|---|---|---|
| 3rd embodiment ⑥ | 1.0 | 1.0 | 0.5 |
| comparative example | 9.5 | 12.5 | 10.5 |

In the measurement result of the Table 4, when the dent amount was 2 μm or less, it was judged as excellent "◎". When the dent amount was in the range of 2 to 10 μm, it was judged as not excellent "◎" but good "○". When the dent amount was 10 μm or more, it was judged as bad "X". This is because the thickness of the top layer 20 was arranged in 10±5 μm in these embodiments and thereby 10 μm or more of the dent amount resulted in an erased top layer 20 and an exposed primer layer 18. The evaluation result including the judgment result is shown in the following Table 5.

TABLE 5

| | claw ① | claw ② | claw ③ | over-all judgment |
|---|---|---|---|---|
| 1st embodiment ① | ○ | ○ | ○ | ○ |
| 1st embodiment ② | ◎ | ◎ | ○ | ◎ |
| 1st embodiment ③ | ◎ | ◎ | ◎ | ◎ |
| 1st embodiment ④ | ◎ | ◎ | ◎ | ◎ |
| 2nd embodiment | ○ | ○ | ○ | ○ |
| 3rd embodiment ① | ○ | ○ | ○ | ○ |
| 3rd embodiment ② | ◎ | ◎ | ◎ | ◎ |
| 3rd embodiment ③ | ◎ | ◎ | ◎ | ◎ |
| 3rd embodiment ④ | ◎ | ◎ | ◎ | ◎ |
| 3rd embodiment ⑤ | ◎ | ◎ | ◎ | ◎ |
| 3rd embodiment ⑥ | ◎ | ◎ | ◎ | ◎ |
| comparative example | ○ | × | × | × |

Figure 8:
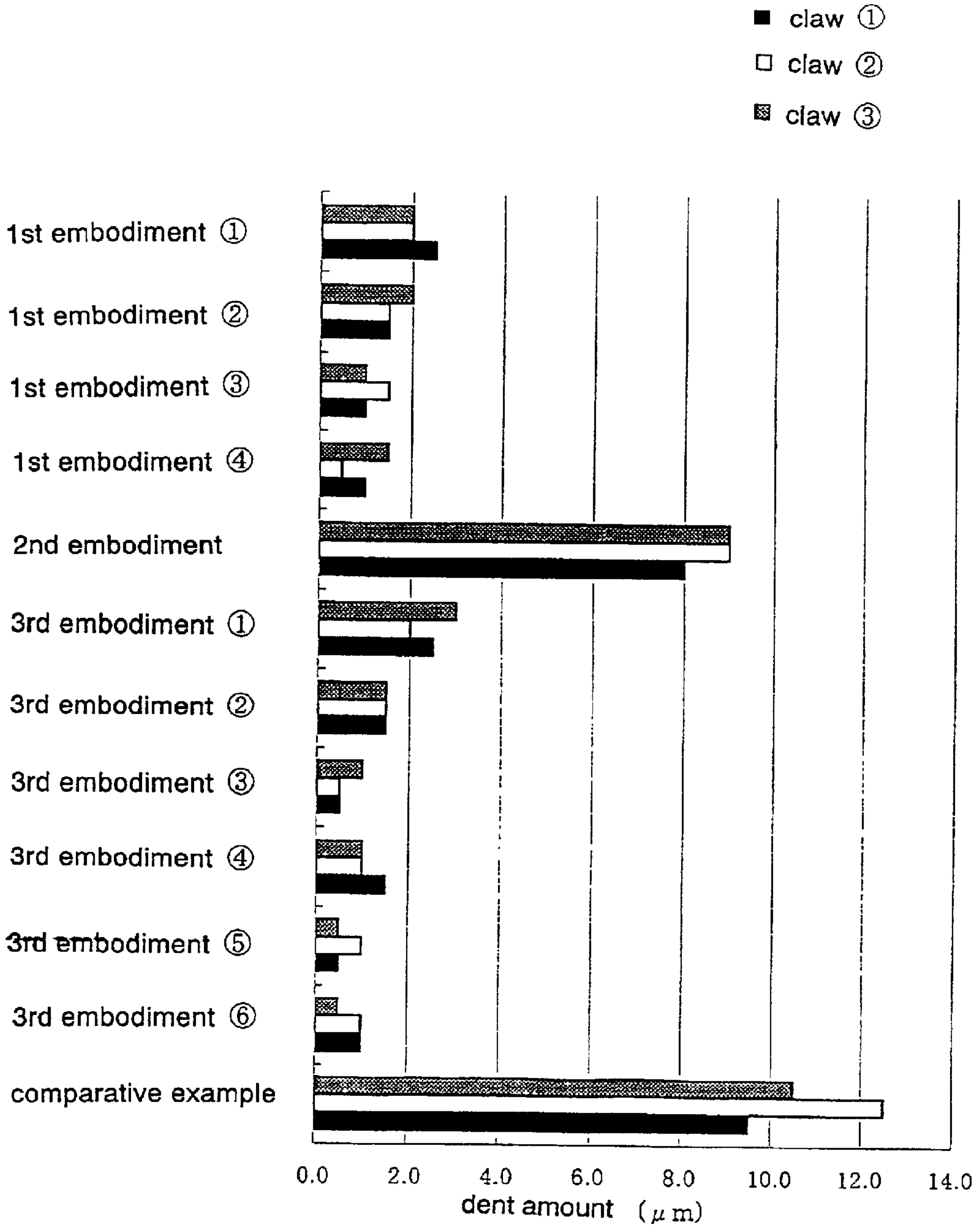
FIG. 8 is a diagram showing a correlation between a dent amount in the surface layer of the heating roller and a mixing rate of glass particles.

As is apparent from Table 4, Table 5, and FIG. 8, except that the measurement result of the comparative example, into neither the primer layer nor top layer of which glass particles are mixed, shows as 10 μm or more of dent amount and bad "X" of judgment, all results of the first to third embodiments show 10 μm or less of dent amount and can be judged basically as good "○".

Particularly, in the first embodiments, into only the top layer 20 of which the glass particles 24 are mixed, except that the first embodiment ① having 0.5 % of mixture ratio shows around 2.0 μm of dent amount and good "○" of judgment, all the first embodiments ② to ④ can be judged as excellent "◎".

In the second embodiment, into only the primer layer 18 of which the glass particles are mixed, it can be judged as good "○". In the third embodiments, into both the primer layer 18 and the top layer 20 of which the glass particles 24 are mixed, excepting the third embodiment ① having 0.5 % of mixture ratio, all the third embodiments ② to ⑥ can be judged as excellent "◎".

Thus, it has been proved that the optimal ratio of the glass particles mixed into the top layer 20 forming an outermost layer of the heating roller 12 was 1.0% or more in weight %.

Further, from the above result, it can be understood that, if the top layer 20 is remained, the scratch resistance will be guaranteed, whether the glass particles 24 are mixed into the top layer 20 or not, and regardless of the weight % of the glass particles 24 mixed into the primer layer 18

In the state where the top layer 20 becomes thin, it has been proved that mixing the glass layer 24 into the primer layer 18 was more effective to the scratch resistance.

It should be clearly understood that the present invention is not limited to the above embodiments, and many other variations and modifications may be made without departing from spirit and scope of the present invention.

Figure 9:
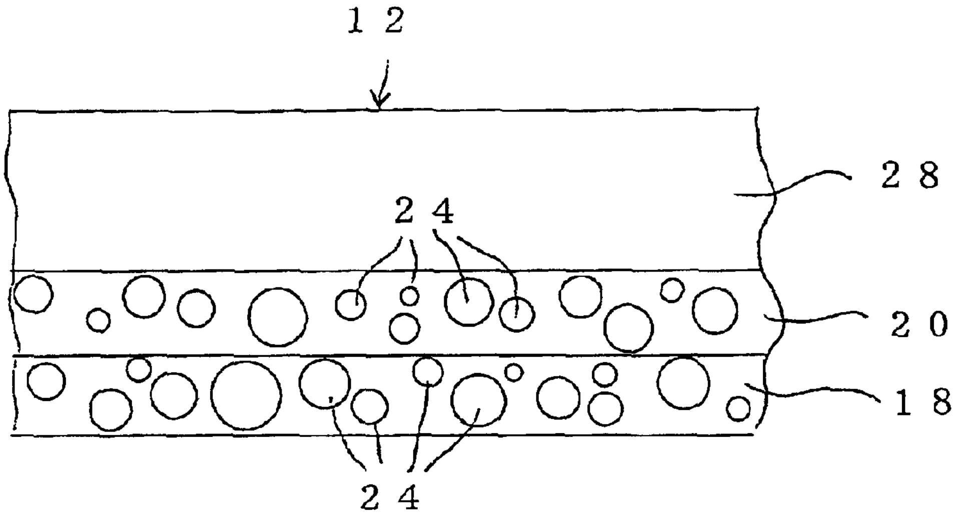
FIG. 9 is a schematic longitudinal sectional view showing a three-layer structure of heating roller as another embodiment of the fixing roller according to the present invention.

For example, while the heating roller 12 has been described as two-layer structure composed of the primer layer 18 and top layer 20 in the embodiment described above, the present invention is not limited to such a structure, and for example as shown in FIG. 9, a fluororesin overtop layer 28 (outermost layer) may be provided on the periphery of the top layer 20. In this case, this overtop layer 28 may be achieved by applying a fluororesin on the periphery of the top layer 20.

In the three-layer structure shown in FIG. 9, the overtop layer 28 is consisted of PFA and no glass particle is mixed thereinto. The primer layer 18 and top layer 20 are also constructed as same as the above third embodiment, that is, the glass particles are mixed into both the primer layer 18 and top layer 20. A total thickness of the entire coating film combined the primer layer 18, top layer 20, and overtop layer 28 is arranged in up to 30 μm.

With constructing the heating roller 12 as the three-layer structure of the primer layer 18, top layer 20, and overtop layer 28, the same verification test of durability as that described above was carried out. Consequently, the same result as the third embodiment could be obtained.

As described above in detail, according to the present invention, by mixing glass particles into either one of the primer layer and top layer, a fixing roller capable of satisfying releasing ability and scratch resistance all together can be provided.

What is claimed is:

1. A fixing roller comprising:

a core;

a primer layer applied on the periphery of said core; and a fluororesin top layer applied on the periphery of said prime layer, wherein glass particles are mixed into either:

said primer layer, or said primer layer and said top layer.

2. A fixing roller as defined in claim 1, wherein said glass articles are mixed into only said primer layer.

3. A fixing roller as defined in claim 1, wherein said glass articles are mixed into both said primer layer and said top layer.

4. A fixing roller as defined in claim 3, where in a mixing ratio of said glass particles in the top layer is arranged in a weight ratio of 1% to less than 3%.

5. A fixing roller as defined in claim 3, which further includes a fluororesin overtop layer applied on the peripheral surface of said top layer.

6. A fixing roller as defined in claim 5, wherein said overtop layer is devoid of the glass particles.

7. A fixing roller as defined in claim 6, wherein the total thickness of said primer layer, top layer, and overtop layer is arranged in up to 30 μm.

8. A fixing roller as defined in claim 6, wherein said overtop layer includes PFA (perfluoroalkoxy resin).

9. A fixing roller as defined in claim 8, wherein the total thickness of said primer layer, top layer, and overtop layer is arranged in up to 30 μm.

10. A fixing roller as defined in claim 5, wherein said overtop layer includes PFA (perfluoroalkoxy resin).

11. A fixing roller as defined in claim 5, wherein the total thickness of said primer layer, top layer, and overtop layer is arranged in up to 30 μm.

12. A fixing roller as defined in claim 1, wherein said top layer includes PFA (perfluoroalkoxy resin).

13. A fixing roller as defined in claim 1, wherein the total thickness of said primer layer and said top layer is arranged in up to 30 μm.

* * * * *